United States Patent
Markusch et al.

(10) Patent No.: US 6,821,059 B2
(45) Date of Patent: Nov. 23, 2004

(54) POLYURETHANE-FORMING COMPOSITION WITH ADJUSTABLE MIX VISCOSITY, GEOTEXTILE COMPOSITES PREPARED THEREFROM AND A PROCESS FOR PRODUCING SUCH COMPOSITES

(75) Inventors: Peter H. Markusch, McMurray, PA (US); Ralf Guether, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 10/641,254

(22) Filed: Aug. 14, 2003

(65) Prior Publication Data

US 2004/0054073 A1 Mar. 18, 2004

Related U.S. Application Data

(62) Division of application No. 09/809,671, filed on Mar. 15, 2001, now Pat. No. 6,632,875.

(51) Int. Cl.[7] .......................... C09K 17/00; E02D 3/00; E02D 3/12; E02D 5/18; E02D 17/20
(52) U.S. Cl. .................... 405/302.7; 405/268; 405/270; 405/302.4
(58) Field of Search ................................ 524/589, 590, 524/591, 839, 840; 528/44; 405/268, 270, 302.4, 302.7

(56) References Cited

U.S. PATENT DOCUMENTS

| 4,454,252 A | 6/1984 | Meyer ........................ 521/110 |
| 4,872,784 A | 10/1989 | Payne ........................ 405/270 |
| 4,955,759 A | 9/1990 | Payne ........................ 405/270 |
| 4,955,760 A | 9/1990 | Payne ........................ 405/270 |
| 5,049,006 A | 9/1991 | Payne ........................ 405/270 |
| 5,062,740 A | 11/1991 | Payne ........................ 405/270 |
| 5,421,677 A | 6/1995 | Adam et al. ................. 405/270 |
| 5,560,736 A | 10/1996 | Mehesch et al. ............. 405/53 |
| 5,607,998 A | * 3/1997 | Markusch et al. .......... 524/494 |

* cited by examiner

Primary Examiner—Patrick D. Niland
(74) Attorney, Agent, or Firm—Joseph C. Gil; John E. Mrozinski, Jr.

(57) ABSTRACT

A polyurethane-forming reaction mixture characterized by its ability to be adjusted with respect to its viscosity in response to changing temperature and humidity conditions is achieved with a mixture that includes a liquid polyisocyanate having an isocyanate group content of at least 10% by weight, an isocyanate-reactive component which includes at least one high molecular weight polyol, a urethane catalyst and from 0.2 to 5 parts by weight per 100 parts by weight of isocyanate reactive component of a viscosity adjusting component. The viscosity adjusting component is preferably a diamine, a polyamine and/or an amine-terminated polyol. This reaction mixture is particularly useful for producing polyurethane geotextile composite materials useful as liners for ditches and canals.

18 Claims, No Drawings

POLYURETHANE-FORMING COMPOSITION WITH ADJUSTABLE MIX VISCOSITY, GEOTEXTILE COMPOSITES PREPARED THEREFROM AND A PROCESS FOR PRODUCING SUCH COMPOSITES

This application is a divisional of U.S. Ser. No. 09/809,671 filed on Mar. 15, 2001 now U.S. Pat. No. 6,632,875.

TECHNICAL FIELD OF THE INVENTION

The present invention relates to a polyurethane composition with adjustable mix viscosity, to a polyurethane geotextile composite prepared with such polyurethane composition and a process for producing such polyurethane geotextile composites.

BACKGROUND OF THE INVENTION

In recent years, the management of natural resources has become important in many countries throughout the world. Efforts have been directed both toward the conservation of our resources and toward the elimination of pollution from our environment. Particular emphasis has been placed on waste leakage and water loss.

Losses in the distribution of water using unlined irrigation ditches are estimated at a minimum to be 25% and in some situations to be more than 50% depending upon the porosity of the ditch surface and the distance the water is being moved. In most rural areas, ditches are formed by excavating the soil to the desired depth and width. The water moves through the ditch in contact with the exposed natural surface. This can be sand, clay, rocks, etc. and, more commonly, mixtures thereof. The porosity will depend upon the proportions of the different components.

The loss of water in unlined irrigation ditches at one time was considered acceptable only because the supply of water exceeded demand. However, as civilization has developed and world population has increased, more water is required for both greater food production and for the markedly increasing non-agriculture uses. In addition to greater domestic uses in sanitation, industry now employs large quantities of water in manufacturing and processing procedures.

This high level of consumption plus the very high cost of developing new water supplies has shifted attention to water conservation. Domestic appliances that use less water have been developed. Also, industry has installed recycling purification systems to reduce water consumption.

Although conservation efforts have reduced water consumption to a degree, water is still in relatively short supply, particularly in recent years with the severe droughts in the United States and other countries. Since the most cost effective conservation opportunities and readily accessible water supplies have already been developed, greater attention must be directed to improving the efficiency of water distribution systems.

Improvements in water distribution have been made. A limited number of ditches and canals have been lined with concrete and/or preformed concrete pipes. Concrete is durable and has a long life when properly used. However, concrete is expensive to place and finish and is damaged by unfavorable temperatures during curing. Also, concrete is subject to frost damage, cracking and heaving which results in leaks.

Processes for forming composite liners for canals and ditches and apparatus to perform such a processes are disclosed, for example, in U.S. Pat. Nos. 4,872,784; 4,955,759; 4,955,760; 5,049,006; 5,062,740; and 5,421,677.

However, the above noted patents give almost no guidance as to solidifiable compositions which should be used. For example, U.S. Pat. No. 4,872,784 (at column 5, lines 55–60), U.S. Pat. No. 4,955,759 (at column 5, lines 58–63), U.S. Pat. No. 4,955,760 (at column 4, lines 55–60) and U.S. Pat. No. 5,062,740 (at column 4, lines 56–61) each broadly suggest the use of a foamed polyurethane resin without disclosing any specific formulations. U.S. Pat. No. 5,049,006 (at column 4, lines 26–32) and U.S. Pat. No. 5,145,282 (at column 5, line 64-column 6, line 2) broadly suggest use of a thermosetting resin forming mixture such as a polyester or a polyurethane forming mixture, without describing any specific formulations.

U.S. Pat. No. 5,421,677 ("the '677 patent") which is directed to an improved process of forming a ditch liner discloses the use of a mixture composed of one or more polyisocyanates, a polyol mixture, one or more fillers, and a catalyst. The mixture of the '677 patent is dispensed on a geotextile, thereby forming a liquid polyurethane impregnated geotextile composite. The liquid polyurethane impregnated geotextile composite is then placed over the surface of an area to be lined and allowed to cure, thereby forming a polyurethane/geotextile composite. The mixture disclosed in the '677 patent cures in a reasonable amount of time and under varying temperature conditions. However, the viscosity of that mixture varies widely.

More specifically, at high temperatures (e.g., 30°–50° C.), the mixture of the '677 patent has an extremely low viscosity. In a ditch liner application, such a low viscosity mixture will tend to flow to the bottom of the ditch. As a result, an uneven ditch liner having very little binder to adhere to the substrate and protect the top of the ditch from seepage is formed. Excess binder settles on the bottom of the ditch. When thick layers of the still liquid polyurethane are formed on the bottom of a ditch, those layers have a tendency to foam under humid conditions. Such foaming weakens the liner by reducing water impermeability.

For the foregoing reasons, it would be desirable to develop a polyurethane composition the viscosity of which may be readily adjusted to obtain optimum performance even when the temperature and humidity at the site where it is being used are not constant. Specifically, a polyurethane composition that maintains the desirable low viscosity of the starting materials but also has a mix viscosity that can be increased to a level such that run off on vertical surfaces is avoided would be advantageous. Additionally, it would be desirable to develop a composite made with such a polyurethane composition, so that a ditch lined with the composite will be sufficiently protected at the outer edges that seepage is substantially avoided and no excess polyurethane composition will settle on the bottom of the ditch.

SUMMARY OF THE INVENTION

The invention is directed toward a polyurethane composition formed from a reaction mixture characterized by an adjustable viscosity which reaction mixture comprises:
  a) a liquid polyisocyanate having an isocyanate group content of at least 10% by weight;
  b) an isocyanate reactive component comprising a polyether polyol having from 2–6 hydroxyl groups and a number average molecular weight of from at least 250 to about 8,000 and 0 to 10% by weight, based on total weight of b), of a low molecular weight (i.e., number average molecular weight less than 250) diol or triol having a hydroxy equivalent weight from about 31 to 99, c) a catalyst for catalyzing the reaction between hydroxyl groups and isocyanate groups;

d) from 0.2 to about 5.0 parts by weight per hundred parts by weight of component b) of a viscosity adjusting material such as a diamine, a polyamine, or an amine-terminated polyol; and optionally, (e) a filler.

The invention is further directed to the polyurethane-forming reaction mixture characterized by adjustable viscosity, a polyurethane geotextile composite produced with such an adjustable polyurethane-forming reaction mixture, a process for producing such composites, and to a process for lining a ditch or canal with such a composite.

The polyurethane-forming reaction mixture characterized by adjustable mix viscosity remains flowable during application, e.g., while it is being applied to a substrate. By "flowable", it is meant that the polyurethane-forming composition with adjustable mix viscosity is still a self leveling liquid having a viscosity low enough to be applied evenly on a substrate such as a geotextile, but also high enough that after it is applied to the substrate, run-off on vertical surfaces such as those of a ditch and/or canal is avoided.

The amount of the viscosity-adjusting compound included in the polyurethane-forming mixture is increased with increasing temperature and lowered at lower temperature to achieve the desirable mix viscosity at any application temperature without any noticeable shortening of the gel time. These and other advantages of the present invention will become better understood by the following description and appended claims.

DETAILED DESCRIPTION OF THE INVENTION

The invention is directed toward a polyurethane-forming mixture which is characterized by its adjustable viscosity comprising:

a) a liquid polyisocyanate having an isocyanate group content of at least 10% by weight;

b) an isocyanate reactive component comprising a polyether polyol having from 2–6 hydroxyl groups and a number average molecular weight of from at least 250 to about 8,000 and 0 to 10% by weight, based on total weight of b), of a low molecular weight diol or triol having a hydroxy equivalent weight of from about 31 to 99, c) a catalyst for catalyzing the reaction between hydroxyl groups and isocyanate groups;

d) from 0.2 to about 5.0 parts by weight per hundred parts by weight of component b) of a viscosity adjusting material such as a diamine, polyamine, or amine-terminated polyol; and optionally, (e) a filler.

The invention is further directed to a polyurethane made from such polyurethane-forming mixture, to a polyurethane geotextile composite made with such polyurethane-forming mixture, a process for making such composites and the use of such composites to line ditches and canals. The polyurethane geotextile composites of the present invention are made by impregnating a geotextile with the above-described polyurethane forming mixture having adjustable mix viscosity and allowing the polyurethane composition to cure.

The invention is also directed to a ditch or canal lined with a polyurethane geotextile composite which is produced by dispensing or impregnating a polyurethane-forming mixture having adjustable mix viscosity onto or into a geotextile, laying that geotextile onto a surface of a ditch or canal before the mixture has fully cured, conforming the polyurethane-forming mixture-containing geotextile to the shape of the surface of the ditch or canal, and allowing the polyurethane composition to fully cure to form a composite which acts as a leakproof liner.

As used herein, the term "geotextile" refers to any woven or non-woven porous blanket or mat which is produced from natural or synthetic fibers. The terms "ditch" and "canal" are used interchangeably and can refer to any liquid-carrying surface having a depression therein or a sloped side.

Geotextiles are used primarily to line earthen surfaces. Such liners may also be used to line roofs, ponds, reservoirs, landfills, underground storage tanks, canals or ditches. Examples of geotextiles include woven or non-woven polypropylene, polyester, jute and cotton fabrics.

Any of the known liquid isocyanates having an isocyanate content of at least 10% by weight, preferably at least 20% by weight, most preferably at least 30% by weight, are useful in the practice of the present invention. Suitable liquid organic polyisocyanates include aliphatic, cycloaliphatic, araliphatic, aromatic, and heterocyclic polyisocyanates of the type described, for example, by W. Siefken in Justus Liebigs Annalen der Chemie, 562, pages 75 to 136. Such isocyanates include those represented by the formula $Q(NCO)_n$, in which n represents a number from 2 to about 5, preferably from 2 to 3, and Q represents an aliphatic hydrocarbon group containing from 2 to about 18, preferably from 6 to 10, carbon atoms, a cycloaliphatic hydrocarbon group containing from 4 to about 15, preferably from 5 to 10, carbon atoms, an araliphatic hydrocarbon group containing from 8 to 15, preferably from 8 to 13, carbon atoms, or an aromatic hydrocarbon group containing from 6 to about 15, preferably from 6 to 13, carbon atoms. Examples of suitable isocyanates include: ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate, and mixtures of these isomers; 1-isocyanato-3,3,5-trimethyl-isocyanatomethylcyclo-hexane ("isophorone diisocyanate" (See, e.g. German Offenlegungsschrift 1,202,785 and U.S. Pat. No. 3,401,190)); 2,4- and 2,6-hexahydro-toluene diisocyanate and mixtures of these isomers; dicyclohexylmethane-4,4'-diisocyanate ("hydrogenated MDI", or "HMDI"); 2,4- and 2,6-toluene diisocyanate and mixtures of these isomers ("TDI"); diphenylmethane-2,4'- and/or -4,4'-diisocyanate ("MDI"); polymethylene poly (phenylisocyanates) of the kind which may be obtained by condensing aniline with formaldehyde, followed by phosgenation ("crude MDI") (which are described, for example, in British Patents 878,430 and 848,671); norbornane diisocyanates (such as described in U.S. Pat. No. 3,492,330); m- and p-isocyanatophenyl sulfonylisocyanates (of the type described in U.S. Pat. No. 3,454,606); perchlorinated aryl polyisocyanates (of the type described, for example, in U.S. Pat. No. 3,227,138); modified polyisocyanates containing carbodiimide groups (of the type described in U.S. Pat. No. 3,152,162); modified polyisocyanates containing urethane groups (of the type described, for example, in U.S. Pat. Nos. 3,394,164 and 3,644,457); modified polyisocyanates containing allophanate groups (of the type described, for example, in British Patent 994,890, Belgian Patent 761,616, and published Dutch Patent Application 7,102,524); modified polyisocyanates containing isocyanurate groups (of the type described, for example, in U.S. Pat. No. 3,002,973, German Patentschriften 1,022,789, 1,222,067 and 1,027, 394, and German Offenlegungschriften 1,919,034 and 2,004,048); modified polyisocyanates containing urea groups (of the type described in German Patentschrift 1,230, 778); polyisocyanates containing biuret groups (of the type described, for example, in German Patentschrift 1,101,394, U.S. Pat. Nos. 3,124,605 and 3,201,372, and in British Patent 889,050); polyisocyanates obtained by telomerization reactions (of the type described, for example, in U.S. Pat. No. 3,654,106); polyisocyanates containing ester groups (of the type described, for example, in British Patents 965,474 and 1,072,956, in U.S. Pat. No. 3,567,763, and in German Patentschrift 1,231,688); reaction products of the above-mentioned isocyanates with acetals (as described in German Patentschrift 1,072,385); and polyisocyanates containing polymeric fatty acid groups (of the type described in U.S. Pat. No. 3,455,883). It is also possible to use the isocyanate-containing distillation residues accumulating in the production of isocyanates on a commercial scale, optionally in solution in one or more of the polyisocyanates mentioned above. It is also possible to use mixtures of the polyisocyanates described above.

In general, it is preferred to use readily available polyisocyanates, such as 2,4- and 2,6-toluene diisocyanates and their isomer mixtures ("TDI"); diphenyl methane diisocyanate ("MDI"); polymethylene poly(phenylisocyanates) of the type obtained by condensing aniline with formaldehyde, followed by phosgenation ("crude MDI"); and polyisocyanates containing carbodiimide groups, urethane groups, allophanate groups, isocyanurate groups, urea groups, or biuret groups ("modified polyisocyanates"). The commercially available phosgenation products of aniline/formaldehyde condensates are particularly preferred polyisocyanates to be used in the present invention.

In general, aliphatic and cycloaliphatic polyisocyanates are less suitable for the purpose of the instant invention than aromatic polyisocyanates.

Particularly preferred polyisocyanates are liquid polyisocyanates having isocyanate group contents of from about 10 to 50% by weight, more preferably from 20 to 35%, most preferably from 30 to 33% by weight. It is generally preferred that the polyisocyanate used have a viscosity of less than 15,000 mPa·s at 25° C.

It is also preferred that the polyisocyanate used be non-volatile at ambient temperature. The presently most preferred isocyanates are polymethylene poly (phenylisocyanates) having an NCO content of from 15 to 33.5% by weight, preferably 30 to 33% by weight and viscosities of from 20 to 3,000 mPa·s at 25° C., and liquid adducts of such poly-isocyanates which have been made with polyols.

Suitable isocyanate-reactive compounds useful in component b) include polyether polyols such as those prepared, for example, by the polymerization of epoxides such as ethylene oxide, propylene oxide, butylene oxide, tetrahydrofuran, styrene oxide, or epichlorohydrin, optionally in the presence of Lewis acids such as $BF_3$, or prepared by chemical addition of such epoxides, optionally added as mixtures or in sequence, to starting components containing reactive hydrogen atoms, such as water, alcohols, or amines. Examples of starting components include: ethylene glycol; 1,3- or 1,2-propanediol; 1,2-, 1,3-, or 1,4-butane-diol; trimethylolpropane; 4,4'-dihydroxydiphenylpropane; aniline; ammonia; ethanolamine; and ethylene diamine. Sucrose polyethers of the type described, for example, in German Offenlegungsschriften 1,176,358 and 1,064,938 may also be used as component b). Polyethers which contain predominantly primary hydroxyl groups (up to about 90% by weight, based on all of the hydroxyl groups in the polyether) are also suitable. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patent 1,152,536) are also suitable, as are polybutadienes containing hydroxyl groups. Particularly preferred polyether polyols include polyoxyalkylene polyether polyols, such as polyoxyethylene diol, polyoxypropylene diol, polyoxybutylene diol, and polytetramethylene diol, as well as polyoxypropylene polyoxyethylene triols.

Other suitable polyether polyols useful in component b) include the so-called "PHD polyols", which are prepared by reaction of an organic polyisocyanate, hydrazine, and a polyether polyol. U.S. Pat. No. 3,325,421 discloses a method for producing suitable PHD polyols by reacting a stoichiometric or substoichiometric quantity (relative to diamine) of polyisocyanate dissolved in a polyol having a molecular weight of at least 500 and a hydroxyl number of no more than 225. See also U.S. Pat. Nos. 4,042,537 and 4,089,835.

Suitable polyether polyols useful in component b) also include the so-called "polymer polyols", which are prepared by polymerizing styrene and acrylonitrile in the presence of a polyether. See, for example, U.S. Pat. Nos. 3,383,351, 3,304,273, 3,523,093, 3,652,639, 3,823,201 and 4,390,645.

The most preferred polyethers are polyoxypropylene polyethers that do not contain ethylene oxide units. It is also particularly preferred that the isocyanate-reactive component contain no more than 0.5% by weight, most preferably no more than 0.1% by weight of water prior to reaction with the polyisocyanate.

Optionally, a low molecular weight organic diol or triol may be included in component b) in an amount of up to 10% by weight, based on total weight of b). Suitable organic diols or triols include, for example, diols and triols having equivalent weights of from about 31 to 99. These compounds include: 2-methyl-1,3-propanediol; ethylene glycol; 1,2- and 1,3-propanediol; 1,3- and 1,4- and 2,3-butanediol; 1,6-hexanediol; 1,10-decanediol; diethylene glycol; triethylene glycol; tetraethylene glycol; dipropylene glycol; tripropylene glycol; glycerol; trimethylolpropane; neopentyl glycol; cyclohexanedimethanol; and 2,2,4-trimethylpentane-1,3-diol. Preferred diols and triols are, for example, dipropylene glycol and tripropylene glycol.

The polyurethane-forming reaction mixture also includes a catalyst c) for catalyzing the reaction between isocyanate groups and hydroxyl groups (i.e., a urethane catalyst). Such catalysts are well known in the art.

It is preferred to use an organometallic compound as the urethane catalyst in the present invention. Suitable catalysts c) are organic tin compounds. The organic tin compounds preferably used are tin(II) salts of carboxylic acids such as tin(II) acetate, tin(II) octoate, tin (II) ethyl hexoate and tin (II) laurate and tin (IV) compounds such as dibutyl tin oxide, dibutyl tin dichloride, dibutyl tin diacetate, dibutyl tin dilaurate, dibutyl tin maleate, dioctyl tin diacetate and the like. It is also possible to use any of the other catalysts which are well known to those skilled in the art of polyurethane chemistry. The urethane catalyst may be used in an amount from about 0.0001% to about 1%, preferably 0.0001 to about 0.1% by weight, based on total weight of the liquid isocyanate reactive component.

It is preferred that the polyurethane-forming mixture not contain any catalyst which would catalyze the reaction between an isocyanate group and water (i.e. tertiary amine catalysts).

The catalyst can be added separately or combined with the isocyanate-reactive component b) and/or the viscosity adjusting component d) prior to combination with the polyisocyanate to form the polyurethane composition.

The polyurethane-forming reaction mixture of the present invention also includes a viscosity adjusting component. Diamines, polyamines and amine-terminated polyols are particularly useful. Amines suitable for use as component d) include: aliphatic, cycloaliphatic and aromatic diamines and triamines having a molecular weight of from about 62 to 400. Although substantially any isocyanate-reactive diamine or triamine could be used as the viscosity adjusting agent, the preferred isocyanate-reactive amines are aliphatic, cycloaliphatic, and aromatic diamines having only primary amino groups. Particularly preferred diamines are aliphatic or cycloaliphatic diamines such as bis(4-aminocyclohexyl) methane and 1-amino-3,3,5-trimethyl-5-aminomethylcyclohexane ("IPDA"). A most preferred diamine is bis(4-aminocyclohexyl)methane.

Typical aromatic diamines useful as the viscosity adjusting component d) in the polyurethane-forming reaction mixture of the present invention have molecular weights of from about 108 to about 400 and preferably contain exclusively aromatically bound primary or secondary (preferably primary) amino groups. The aromatic diamines preferably have alkyl substituents in at least one position ortho to the amino groups. In particular, such aromatic diamines preferably have at least one $C_1$–$C_3$ alkyl substituent located ortho to one of the amino groups and two $C_1$–$C_3$ alkyl substituents located ortho to the other amino group, especially with an ethyl, propyl, and/or isopropyl substituent in at least one such ortho position and with methyl substituents optionally present in other ortho positions. Mixtures of such aromatic diamines are, of course, also suitable. Suitable aromatic diamines include: 2,4-diaminomesitylene; 1,3,5-triethyl-2,4-diaminobenzene; 1,3,5-triisopropyl-2,4-diaminobenzene; 1-methyl-3,5-diethyl-2,4-diaminomesitylene; 1-methyl-3,5-diethyl-2,6-diaminobenzene; 4,6-dimethyl-2-ethyl-1,3-diaminobenzene; 3,5,3',5'-tetraethyl-4,4'-diaminodiphenylmethane; 3,5,3',5'-tetraisopropyl-4,4'-diaminodiphenylmethane; and 3,5-diethyl-3',5'-diisopropyl-4,4'-diaminodiphenylmethane. Other suitable but less preferred aromatic diamines include: 1,4-diaminobenzene; 2,4-diaminotoluene; 2,4'- or 4,4'-diaminodiphenylmethane; 3,3'-dimethyl-4,4'-diaminodiphenylmethane; 4,4'-diaminodiphenyl propane-(2,2), t-butyl toluene diamine; and 1-methyl-3,5-bis-(methylthio)-2,4- or -2,6-diaminobenzene; and mixtures of such diamines. Particularly preferred aromatic diamines include; diethyl toluene diamines, such as, 1-methyl-3,5-diethyl-2,4-diaminobenzene, either alone or as a mixture with 1-methyl-3,5-diethyl-2,6-diaminobenzene.

Suitable but much less preferred viscosity adjusting compounds contain both hydroxyl and amino groups. Mixtures of such compounds with the compounds mentioned above are, of course, also suitable.

Also suitable for use as component d) are polyethers terminated with aromatic amino groups, the so-called "amine terminated polyethers" containing aromatically bound primary or secondary (preferably primary) amino groups. Compounds containing amino end groups can also be attached to the polyether chain through urethane, ester, or ether groups. These aromatic amine terminated polyethers can be prepared by any of several methods known in the art.

Methods for making polyethers containing aromatic amino end groups are disclosed, for example, in German Offenlegungsschriften 2,019,432 and 2,619,840 and U.S. Pat. Nos. 3,808,250, 3,975,428, and 4,016,143. Relatively high molecular weight compounds containing amino end groups may also be obtained according to German Offenlegungsschrift 2,546,536 or U.S. Pat. No. 3,865,791 by reacting isocyanate prepolymers based on polyhydroxyl polyethers with hydroxyl-containing enamines, aldimines, or ketimines and hydrolyzing the reaction product.

Preferred aromatic amine terminated polyethers for use as viscosity adjusting component d) include aminopolyethers obtained by the hydrolysis of compounds containing isocyanate end groups. For example, in a process disclosed in German Offenlegungsschrift 2,948,419, polyethers containing hydroxyl groups (preferably two or three hydroxyl groups) are reacted with polyisocyanates to form isocyanate prepolymers whose isocyanate groups are then hydrolyzed to form amino groups. Particularly preferred amine terminated polyethers are prepared by hydrolyzing an aromatic isocyanate compound having an isocyanate group content of from 0.5 to 40% by weight. The most preferred of such polyethers are prepared by first reacting a polyether containing from two to four hydroxyl groups with an excess of an aromatic polyisocyanate to form an isocyanate terminated prepolymer and then converting the isocyanate groups to amino groups by hydrolysis.

Other processes for the production of useful amine terminated polyethers using isocyanate hydrolysis techniques are described in U.S. Pat. Nos. 4,386,218, 4,454,730, 4,472, 568, 4,501,873, 4,515,923, 4,525,534, 4,540,720, 4,578,500, and 4,565,645; (all of the disclosures of which are herein incorporated by reference); European Patent Application 97,299; and German Offenlegungsschrift 2,948,419. Similar products are also described in U.S. Pat. Nos. 4,506,039, 4,525,590, 4,532,266, 4,532,317, 4,723,032, 4,724,252 and 4,855,504.

Other suitable amine terminated polyethers include aminophenoxy-substituted polyethers such as those described, for example, in published European Patent Applications 288,825 and 268,849.

Diamines, polyamines, and amine-terminated polyethers can be used alone or combination. They can be added separately to the solidifiable polyurethane-forming reaction mixture or combined with the liquid isocyanate reactive component b) prior to mixing with the polyisocyanate component a). The amount of viscosity adjusting agent d) used to prepare the solidifiable liquid polyurethane-forming reaction mixture at any temperature between 10° C. and 50° C. is chosen to result in a mix viscosity between 500 and 8,000 mPa.s, preferably from 800 to 5,000 mPa.s.

The viscosity of the polyurethane-forming reaction mixture without the viscosity adjusting compound at any given temperature and the type of compound used as the viscosity adjusting agent will determine the amount of that viscosity adjusting compound to be added to achieve the desired mix viscosity range. The specific amount to be added can readily be determined by a simple preliminary test.

Optionally, fillers can be included in the polyurethane-forming mixtures of the present invention. The fillers useful herein are also known. Useful fillers include calcium carbonate, barium sulfate, kieselguhr, whiting, mica, glass fibers, liquid crystal fibers, glass flakes, glass balls, aramide fibers, and carbon fibers. In addition, ground solid plastics (such as polyurethane scrap), rubber wastes (such as from tires), or any kind of ground rubber may be used.

If a filler is used it can be added to either the liquid polyisocyanate component or the isocyanate-reactive component prior to forming the solidifiable liquid mixture or it may be separately metered into the mixture.

In the practice of the invention, the liquid polyisocyanate component a) is mixed with the isocyanate reactive component b) and, viscosity adjusting compound d) in the presence of a catalyst c) and optionally, filler e) at an NCO:(OH+NH) equivalent ratio from 1.4:1 to 0.9:1, preferably from 1.1:1.0 to 1.0:1.0.

In one embodiment of the present invention, the polyurethane-forming mixture characterized by adjustable viscosity is used to produce a polyurethane geotextile composite lining for a ditch and/or canal. In this embodiment, the ditch and/or canal is lined with a machine such as that described in U.S. Pat. No. 5,639,331 ("the '331 patent").

The '331 patent teaches a mobile ditch lining apparatus comprising reservoirs for supplying raw materials such as resin, catalysts, fillers, colors or other additives. The reservoirs are connected to a mixing chamber through flexible conduit means. The delivery rate of the raw materials to the mixing chamber will vary depending upon the particular formulation and quantity thereof required for a specific area of the liner being formed. The components used to produce polyurethane-forming reaction mixture composition having adjustable mix viscosity are mixed in such a mixing chamber.

From the mixing chamber, the polyurethane-forming reaction mixture having adjustable mix viscosity is applied to one or more geotextiles. The geotextiles are pulled from a vat containing the polyurethane-forming reaction mixture with adjusted mix viscosity through an adjustable die. The opening of the die provides even distribution of the polyurethane-forming reaction mixture on the geotextile, determines how much polyurethane is dispensed on the geotextile, and also controls the thickness of the polyurethane impregnated in the geotextile composite. The polyurethane impregnated geotextile is then cut to the desired length and placed in the canal or ditch where it conforms to the surface and cures to form a polyurethane geotextile composite liner. Installing the impregnated polyurethane geotextile liners in such a way that they overlap to a certain extent assures that after curing a seamless permanent flexible polyurethane composite liner is obtained.

In another embodiment of the present invention the polyurethane-forming reaction mixture having adjustable mix viscosity is applied to the geotextile by spraying using commercially available two-component polyurethane spray equipment. The polyurethane impregnated geotextile is subsequently placed in the ditch or canal where it conforms to the surface and cures to form a polyurethane geotextile composite. The geotextile can also first be cut to size and placed in the canal or ditch before the polyurethane-forming reaction mixture with adjustable mix viscosity is sprayed onto it. Preferably, the geotextile with the still liquid polyurethane-forming reaction mixture on it is rolled with a paint roller to allow that mixture to penetrate through the geotextile to the surface of the ditch or canal.

It is also feasible to first spray the polyurethane-forming reaction mixture with adjustable mix viscosity onto one geotextile and then apply another geotextile over the first, sprayed geotextile.

In another embodiment of the invention, the polyurethane-forming reaction mixture having adjustable mix viscosity is first sprayed on the concrete (even broken or cracked concrete) of a concrete lined ditch and subsequently a geotextile is placed over it so that the geotextile absorbs the still liquid polyurethane to form a polyurethane-forming reaction mixture which will subsequently cure to form a solid yet flexible polyurethane/geotextile composite.

State of the art sprayable polyurethane formulations are not useful in the present invention because they exhibit gel times of only several seconds. In order to prepare the polyurethane geotextile composites useful as liners in the present invention, a polyurethane-forming reaction mixture having adjustable mix viscosity with gel times of at least five minutes, preferably more than 10 minutes are required.

If additional layers of polyurethane composite are desirable, any of the above processes can be repeated one or more times.

The thickness of the polyurethane geotextile composite can be varied over a wide range but usually measures from about 50 microns to about 500 microns.

The amount of polyurethane applied to the geotextile(s) can be varied but usually the polyurethane applied per square meter of geotextile ranges from 1 kg to 20 kg, preferably from 2 kg to 5 kg.

If desirable, several layers of the polyurethane-forming reaction mixture impregnated geotextile(s) may be applied over each other to obtain a composite of higher strength and dimensional stability. Such multi-layered composites are actually the preferred mode for lining an earthen canal or ditch.

The following examples further illustrate details for the preparation and use of the compositions of this invention.

EXAMPLES

The following materials were used in the Examples given below.

| | |
|---|---|
| Isocyanate A: | polymethylene poly (phenylisocyanate) having an NCO content of about 31.5%, a functionality of 2.6 and a viscosity at 25° C. of 200 mPa · s. |
| Polyol 1: | a monoethanolamine-started propylene oxide polyether polyol having an OH number of about 350, a functionality of about 3 and a number average molecular weight of about 480. |
| Polyol 2: | a glycerine-started propylene oxide polyether polyol having an OH number of about 250, a functionality of about 3 and a number average molecular weight of about 670. |
| Polyol 3: | a propylene glycol-started propylene oxide polyether polyol having an OH number of 56, a functionality of about 2 and a molecular weight of about 2000. |
| Amine 1: | bis(4-aminocyclohexyl)methane |
| Amine 2: | isophoronediamine |
| Amine 3: | m-xylylenediamine |
| Catalyst A: | dimethyltin dilaurate, commercially available as Fomrez UL-28 from Witco. |
| Geotextile A: | Typar-3301, spunbonded polypropylene, 3 oz/yd$^2$, 12 mils thickness (Reemay) |
| The following polyol blend was used in each of Examples 1–13: | |
| Polyol Blend A | 10 pbw Polyol 1<br>45 pbw Polyol 2<br>45 pbw Polyol 3 |

Examples 1–11

100 parts of Polyol Blend A were mixed with varying amounts of one of Amines 1, 2, or 3 and isocyanate A and were applied to a heated surface. The dependence of mix viscosity on amine content can be appreciated from the data given in Tables 1, 2 and 3. The specific Amine used, the amount of each of the reaction mixture components and the physical properties determined for each polyurethane forming reaction mixture are reported in Table 1, 2 and 3.

TABLE 1

Amine 1 Used as Viscosity-Adjusting Compound

|  | Example 1* | Example 2 | Example 3 |
|---|---|---|---|
| Polyol Blend A (grams) | 100 | 100 | 100 |
| Isocyanate A (grams) | 42.5 | 43.1 | 43.75 |
| Amine 1 (grams) | — | 0.5 | 1 |
| Raw Material Temperature (° F.) | 100 | 100 | 100 |
| Surface Temperature (° F.) | 120 | 120 | 120 |
| Catalyst A Concentration (%) | 0.0025 | 0.0022 | 0.0022 |
| Viscosity (mPa · s) | 180 | 680 | 3300 |
| Gel time (min) | 9:30 | 10:30 | 9:07 |

*Comparative

TABLE 2

Amine 2 Used as Viscosity-Adjusting Compound

|  | Example 4* | Example 5 | Example 6 |
|---|---|---|---|
| Polyol Blend A (grams) | 100 | 100 | 100 |
| Isocyanate A (grams) | 42.5 | 44.3 | 45.1 |
| Amine 2 (grams) | — | 1 | 1.5 |
| Raw Material Temperature (° F.) | 100 | 100 | 100 |
| Surface Temperature (° F.) | 120 | 120 | 120 |
| Catalyst A Concentration (%) | 0.0025 | 0.001 | 0.001 |
| Viscosity (mPa · s) | 180 | 2160 | 6200 |
| Gel time (min) | 9:30 | 8:45 | 8:17 |

*Comparative

TABLE 3

Amine 3 Used as Viscosity-Adjusting Compound

|  | Example 7* | Example 8 | Example 9 | Example 10 | Example 11 |
|---|---|---|---|---|---|
| Polyol Blend A (grams) | 100 | 100 | 100 | 100 | 100 |
| Isocyanate A (grams) | 42.5 | 43.7 | 44.7 | 45.2 | 45.8 |
| Amine 3 (grams) | — | 0.5 | 1 | 1.25 | 1.5 |
| Raw Material Temperature (° F.) | 100 | 100 | 100 | 100 | 120 |
| Surface Temperature (° F.) | 120 | 120 | 120 | 120 | 120 |
| Catalyst A Concentration (%) | 0.0025 | 0.0015 | 0.0015 | 0.0015 | 0.00125 |
| Viscosity (mPa · s) | 180 | 720 | 1390 | 2520 | 5700 |
| Geltime (min) | 9:30 | 10:09 | 9:35 | 9:20 | 8:40 |

*Comparative

The addition of varying amounts of amine to the formulation increases the polyurethane-forming reaction mixture viscosity and overcomes the previously described flow problems from, for example, vertical sides of a ditch and/or canal. It is also apparent from the data presented in Tables 1, 2 and 3 that the addition of the amine viscosity adjusting component does not significantly shorten the gel time and allows approximately the same amount of working time for the application process as the compositions of comparative mixtures in which no amine was included.

Examples 12–13

A polyurethane impregnated geotextile composite produced from a polyurethane-forming mixture containing a viscosity adjusting compound and another produced from a corresponding mixture in which no viscosity adjusting compound was included were made to demonstrate how the increased mix viscosity in the formulation overcomes the run-off problem. 1 part by weight (pbw) of Amine 1 was added to 100 pbw of Polyol Blend A and then reacted with the 43.75 pbw Isocyanate A (according to Example 3). The reaction mixture was then spread between two 1×1 sq. ft. pieces of Geotextile A and evenly distributed between the geotextiles using a rubber roller. The composite was then applied onto a 45° sloped surface. The same experiment was performed with the formulation used in Example 1 without the amine component. After these composites were completely cured, the 1×1 sq. ft. pieces were cut into three pieces (top, middle, bottom) of the same size and then weighed to determine the resin loading. The results are shown in Table 4. It can be seen from Comparative Example 12 that without the use of the viscosity adjusting component, the resin ran-off and collected on the bottom of the slope. Example 13 shows that after addition of the amine compound no run-off was observed.

TABLE 4

|  | Example 12* | Example 13 |
|---|---|---|
| Top | 41.5 g | 70.5 g |
| Middle | 61.4 g | 107.7 g |
| Bottom | 168.5 g | 70.7 g |

*Comparative

The following Table 5 shows the increase in mix viscosity achieved at different amine concentrations and temperatures. These data clearly indicate that the amount of amine used to adjust the viscosity has to be increased with increasing temperature in order to maintain a high enough mix viscosity to avoid run-off of the polyurethane composition.

TABLE 5

Viscosity Data for Different Amine Concentrations and Temperatures

| Raw Material Temperature (° C.)/Viscosity (mPa · s) | Concentration of Amine 1 in pbw | | | | | | |
|---|---|---|---|---|---|---|---|
|  | 0 | 0.6 | 0.8 | 1 | 1.2 | 1.4 | 1.6 |
| 21.1 | 480 | 1600 | 2240 | 2800 |  |  |  |
| 26.7 | 320 | 1280 | 1800 | 2200 | 2960 | 3280 | 4000 |
| 32.2 | 200 | 880 | 1080 | 1600 |  |  |  |
| 37.8 | 140 | 740 | 1040 | 1200 |  |  |  |

Although the invention has been described in detail in the foregoing for the purpose of illustration, it is to be understood that such detail is solely for that purpose and that variations can be made therein by those skilled in the art without departing from the spirit and scope of the invention.

What is claimed is:

1. A process for forming a polyurethane geotextile composite-lined ditch or canal comprising:
   (1) spraying onto the ditch surface of a polyurethane-forming reaction mixture with adjustable mix viscosity comprising
      a) a liquid polyisocyanate having an isocyanate group content of at least 10% by weight,
      b) an isocyanate reactive component comprising a polyether polyol having from 2–6 hydroxyl groups and a number average molecular weight of from 250 to about 8,000 and 0–10% by weight, based on total weight of b), of a low molecular weight diol or triol having a hydroxy equivalent weight of from about 31 to 99,
      c) a catalyst for catalyzing the reaction between hydroxyl groups and isocyanate groups,
      d) From 0.2 to about 5.0 parts by weight per hundred parts by weight of isocyanate-reactive component b) of a viscosity adjusting component, and optionally,
      e) a filler;
   (2) applying a geotextile to the sprayed ditch surface before the mixture has fully cured in a manner such that at least a portion of the sprayed mixture will permeate the surface of the geotextile;
   (3) conforming the geotextile to the shape of the ditch; and
   (4) allowing the sprayed mixture to cure.

2. A ditch or canal lined with a polyurethane geotextile composite produced by the process of claim 1.

3. The process of claim 1, wherein the isocyanate reactive component b) contains no more than 0.1% by weight water prior to reaction with the liquid polyisocyanate a).

4. The process of claim 1, wherein the amounts of components a), b) and d) are such that the NCO:(OH+NH) equivalent ratio is from 1.4:1 to 0.9:1.

5. The process of claim 1, wherein the amounts of components a), b) and d) are such that the NCO:(OH+NH) equivalent ratio is from 1.1:1.0 to 1.0:1.0.

6. The process of claim 1, wherein the liquid polylsocyanate a) has an isocyanate group content greater than 20% by weight.

7. The process of claim 1, wherein the liquid polyisocyanate a) has an isocyanate group content greater than 30% by weight.

8. The process of claim 1, wherein catalyst c) is an organometallic compound.

9. The process of claim 1, wherein the polyether polyol of isocyanate-reactive component b) is a polyoxypropylene polyether having a number average molecular weight of from 400 to 4,000 and an average functionality of from 2 to 3.

10. The process of claim 1, wherein a sufficient amount of viscosity adjusting component d) is added to increase the viscosity of the mixture to about 500 to about 8,000 mPa·s at temperatures from about 10° C. to about 50° C.

11. The process of claim 1, wherein a sufficient amount of viscosity adjusting component d) is added to increase the viscosity of the mixture to about 800 to 5,000 mPa·s at temperatures of from 10° to 50° C.

12. The process of claim 1, wherein the viscosity adjusting component is chosen from diamines, polyamines, amine-terminated polyols and combinations thereof.

13. The process of claim 1, wherein of the viscosity adjusting component is chosen from bis(4-aminocyclohexyl)methane, isophoronediamine, m-xylyienediamine and combinations thereof.

14. The process of claim 1, wherein the catalyst is a in compound which is present in an amount of from 0.001 to 0.1% by weight, based on component b).

15. The process of claim 1, wherein the liquid polyisocyanate is an aromatic polyisocyanate.

16. The process of claim 1, wherein the liquid polyisocyanate is a polymethylene poly(phenylisocyanate) having an NCO-content of from about 30 to 33% and a viscosity of from about 20 mPa·s to 2.000 mPa·s at 25° C.

17. The process of claim 1, wherein the composition does not include any filler e).

18. The process of claim 1, wherein the isocyanate reactive component b) does not include any low molecular weight diol or triol.

* * * * *